United States Patent [19]
Kato et al.

[11] Patent Number: 5,148,271
[45] Date of Patent: Sep. 15, 1992

[54] METHOD FOR TRANSMISSION OF VARIABLE LENGTH CODE AND APPARATUS FOR CODING A VIDEO SIGNAL

[75] Inventors: Shiro Kato, Hirakata; Tatsuro Juri, Osaka; Masakazu Nishino, Kashiwara, all of Japan

[73] Assignee: Matsushita Electric Industrial Co., Ltd., Osaka, Japan

[21] Appl. No.: 686,388

[22] Filed: Apr. 17, 1991

[30] Foreign Application Priority Data

Apr. 17, 1990 [JP] Japan .................................. 2-101298
Feb. 6, 1991 [JP] Japan .................................. 3-15190

[51] Int. Cl.⁵ .............................................. H04N 7/12
[52] U.S. Cl. ...................................... 358/133; 375/27; 375/25; 382/56
[58] Field of Search ..................... 358/133; 375/25, 27; 382/56

[56] References Cited

U.S. PATENT DOCUMENTS 4,942,465  7/1990  Ohta .................................... 358/133
5,047,852  9/1991  Hanyu et al. ........................ 358/133
5,073,821  12/1991 Juri .................................... 358/133

OTHER PUBLICATIONS

"An Experimental Study for a Home Use Digital VTR", IEEE Transactions on Consumer Electronics, vol. 35, No. 3, Aug. 1989, C. Yamamitsu et al., Matsushita Electric Industrial Co., Osaka, Japan, pp. 450–457.

Primary Examiner—John K. Peng
Attorney, Agent, or Firm—Wenderoth, Lind & Ponack

[57] ABSTRACT

A method for transmission of variable length code words is provided in which the variable length code words are allocated into a data storage field not only from the front end of the same but also from the rear end, whereby unwanted affection by transmission error will be minimized. A coding apparatus produces coded data of such a format that after different type video signals are divided into a common signal area and a not-common signal area, the coded data of the common signal area is allocated into one data storage field in a sequence from the front end of the same and the coded data of the not-common signal area is allocated in a reverse sequence from the rear end. Accordingly, such different video signals can successfully be decoded with a decoder designed for processing one particular video signal.

14 Claims, 8 Drawing Sheets

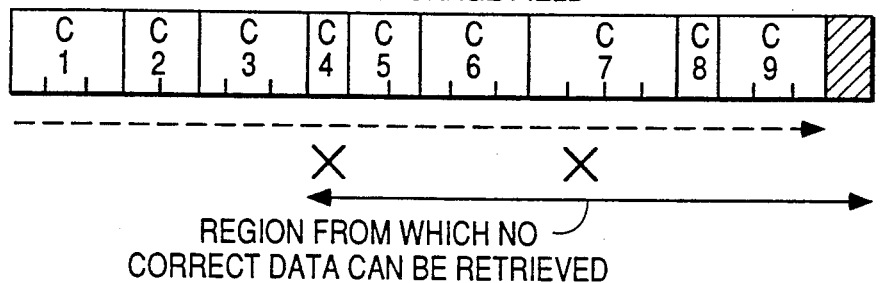
*FIG. 1*
PRIOR ART
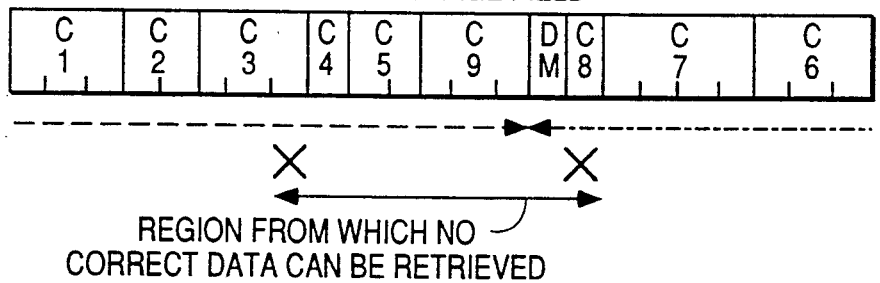
*FIG. 2-a*
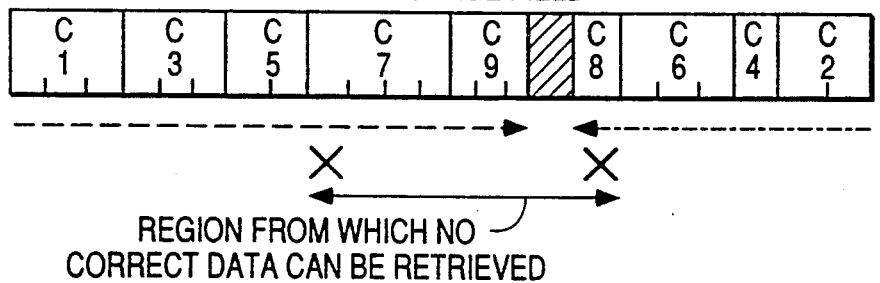
*FIG. 2-b*

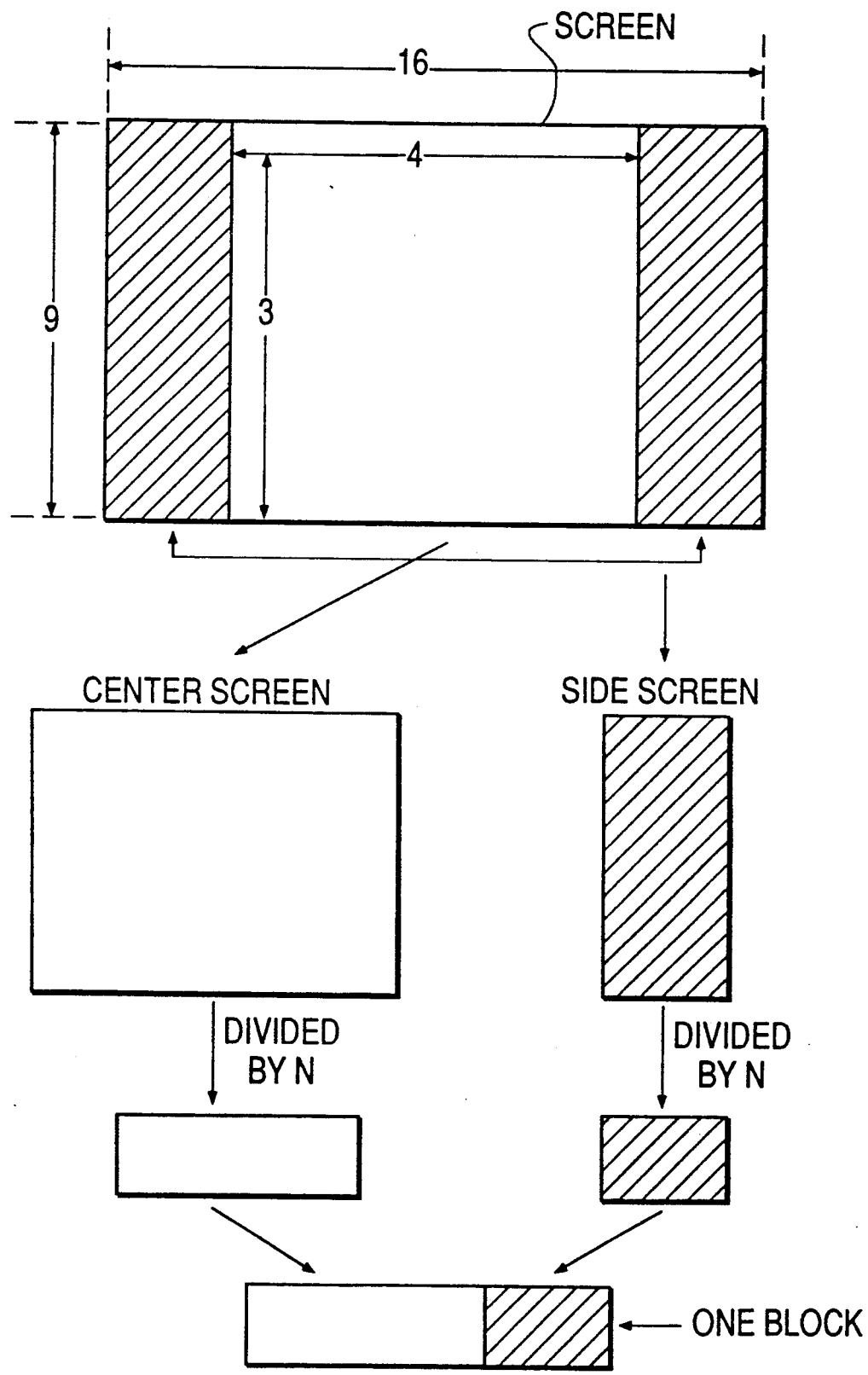

5,148,271

METHOD FOR TRANSMISSION OF VARIABLE LENGTH CODE AND APPARATUS FOR CODING A VIDEO SIGNAL

BACKGROUND OF THE INVENTION

1. Field of the Invention

The present invention relates to a method for transmission (the definition of which is intended to include a term of "recording") of variable length coded data with less affection of transmission error and also, to a video signal coding apparatus for production of code data of a given transmission format which are encoded at high efficiency through variable length coding and can be decoded with a common decoder designed for processing conventional video signals which are different from the video signal of the apparatus.

2. Description of the Prior Art

Variable length coding, e.g. Huffman coding, has widely been employed for achievement of highly efficient data transmission, in which short code words are assigned to particular data which are frequently used so that the overall amount of code elements to be transmitted can be minimized.

In general, variable length code words are allocated to data storage fields in the transmission format and after accompanied with an error correcting code, modulated for transmission. The variable length code words in the data storage field are aligned from the front end in the bit serial arrangement.

FIG. 1 illustrates a group of variable length code words allocated to a given area for transmission in a prior art. More specifically, nine variable length code words C1 to C9 are allocated to a data storage field which has a 23-bit length (smaller than a common size for ease of description).

The hatching area in FIG. 1 represents a vacant space where no variable length code word is loaded. As the allocation of variable length code words to the data storage field substantially leaves such a gap space, extra information is needed for indicating the end of a stream of the storage data.

For application of such information, there are some methods including a technique of adding a particular code (referred to as a mark code) to the end of the stream of the variable length code words stored in the data storage field and a technique of separately transmitting the information about the size of the variable length code word stream as side information. Although any method is eligible with the present invention, the description will be proceeded with respect to the technique using a mark code. The mark code is represented by C9 in FIG. 1 as exhibiting in the end of the variable length code word stream.

As each variable length code word is different in length, an error, when occurs, will be propagated. As the result, the variable length code words after the location of the error will be no more decoded correctly.

The disadvantage of the prior art technique of transmission of variable length code words which are simply aligned in one row is that when an error occurs in a data storage field, the variable length code words after the error location in the storage field will be no more decoded correctly (see "An experimental study for a home-use digital VTR" by C. Yamamitsu et al, IEEE Trans. CE, CE-35, No. 3, Aug. 1989, pp 450–457). The error location is denoted by the mark X in FIG. 1 and the remaining of the variable length code words which cannot be decoded correctly is indicated by the real line arrow.

It is known that for ease of recording or transmission of video signals which carry a large amount of data, the data are compressed by a high efficiency coding so that no noticeable failure can appear in reproduced pictures. Such a high efficiency coding commonly involves orthogonal transformation and variable length coding.

There have been developed different TV systems, e.g. EDTV and high definition TV of which aspect ratio is 16:9 as compared with 4:3 in the conventional TV system. Accordingly, an improved coding apparatus is required for processing different type video signals. However, a known coding apparatus which is designed for processing video signals associated with a 4:3 aspect ratio cannot handle specific coded data produced from 16:9 aspect ratio video signals by means of the high efficiency coding.

SUMMARY OF THE INVENTION

A primary object of the present invention is to provide a method for transmission of variable length code words in which while the data transmission efficiency remains high, transmission error is minimized so that more numbers of the variable length code words can successfully be transmitted.

For achievement of the purpose, the method of variable length code word transmission according to the present invention, in which two groups of the variable length code words are allocated in a specific order into a data storage field having a given bit length for transmission, comprises a first step of allocating the variable length code words of the first group into the data storage field in a sequence from the front end towards the rear end and a second step of allocating the variable length code words of the second group into the data storage field in a reverse sequence from the rear end towards the front end.

Accordingly, the decoding of variable length code words can be commenced not only from the front end of the data storage field but also from the rear end. Hence, the transmission efficiency will be no longer declined and if transmission error is involved, more numbers of the variable length code words will successfully be decoded than in the prior art.

A second object of the present invention is to provide a coding apparatus for producing coded data of such a transmission format that a corresponding picture can be played back with either a first video signal decoding apparatus or a second video signal decoding apparatus.

For the purpose, the coding apparatus of the present invention for encoding a first video signal at high efficiency by means of variable length coding, comprises: a blocking circuit for dividing into N groups first signal data, which represent a common signal area data to the first video signal and a second video signal which is different in type from the first video signal, and also, second signal data into N groups, which represent a not-common signal area data, and coupling the first signal data groups and the second signal data groups with each other to form an N number of blocks, each block consisting of a first and a second signal data group; a coding circuit for encoding the first signal data of each block to a first group of variable length code words and the second signal data of the block to a second group of variable length code words so that a sum of the bit amount of the first group variable length code words and the bit amount of the second group variable length code words is not more than a given value; and a formatting circuit for allocating the first group variable length code words of each block into a data storage field of the transmission format in a sequence from one end of the data storage field and the second group variable length code words into the remaining area of the data storage field where no first group data is loaded.

Accordingly, the coded data of different video signals become identical to one another in the basic of a format and at least their common portions can be decoded by any video signal decoder.

BRIEF DESCRIPTION OF THE DRAWINGS

FIG. 1 illustrates an arrangement of variable length code words allocated into a data storage field by a prior art method of variable length code transmission;

FIG. 2 illustrates symbols used for FIGS. 2-a and 2-b;

FIG. 2-a is a view showing a first example of the allocation of variable length code words into a data storage field associated with a method of variable length code transmission of the present invention;

FIG. 2-b is a view showing a second example of the allocation of variable length code words into a data storage field associated with a method of variable length code transmission of the present invention;

FIG. 9 is an explanatory view showing a method of processing a 16:9 aspect ratio picture of the present invention.

DESCRIPTION OF THE PREFERRED EMBODIMENTS

Figure 3:
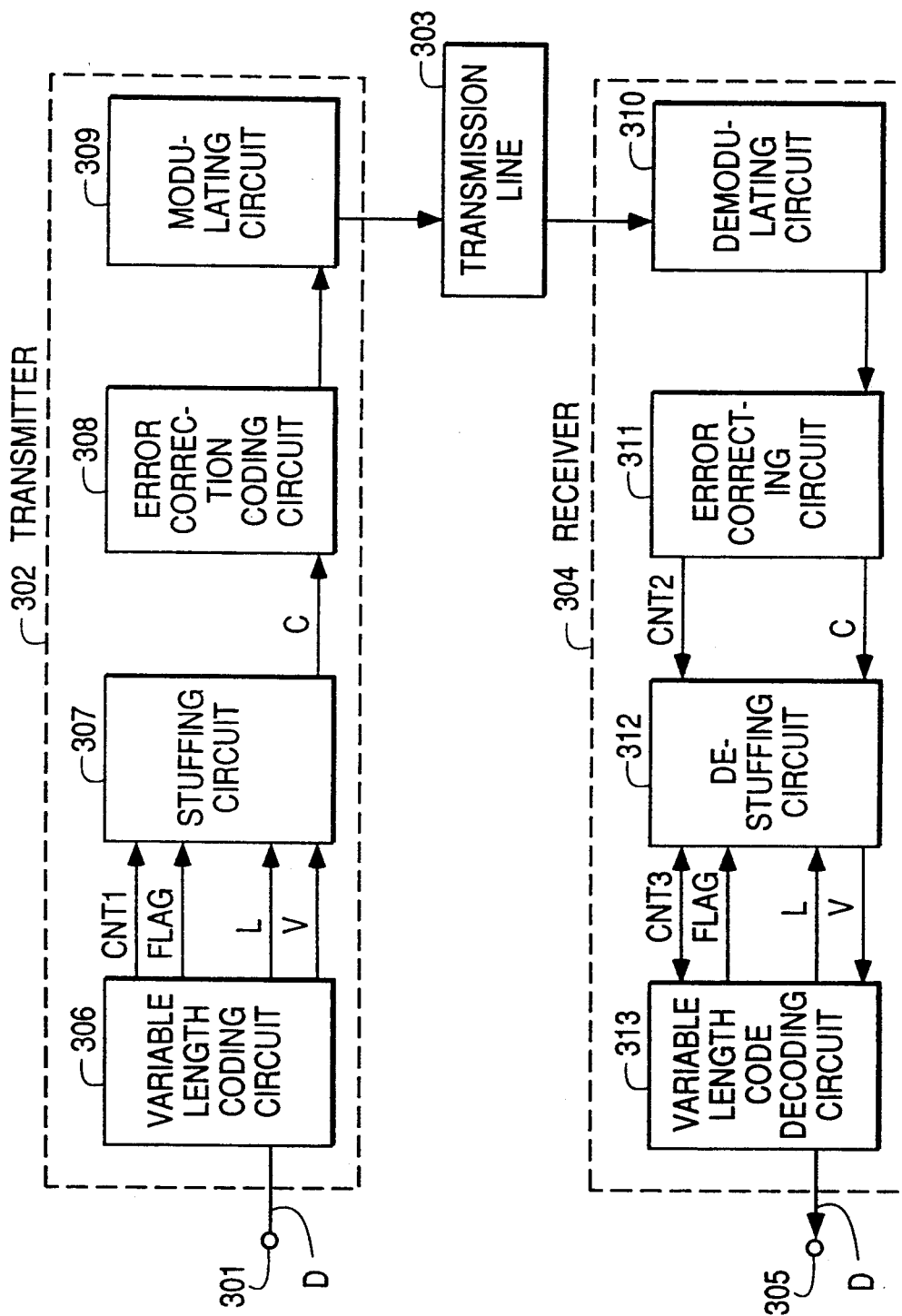
FIG. 3 is a block diagram of a data transmission apparatus showing one embodiment of the present invention.

The principles of a method for transmission of variable length coded data according to the present invention will first be described prior to preferred embodiments of the present invention.

The present invention resides in transmission of two groups of variable length code words allocated into one data storage field. The variable length code words of the first group are aligned in a sequence from the front end of the data storage field and the code words of the second group are aligned in a reverse sequence from the rear end of the same. The two groups of variable length code words may contain different data from each other or may represent one set of variable length code words.

FIGS. 2-a and 2-b illustrate the allocation of variable length coded data into a data storage field associated with the transmission of variable length code words of the present invention. For the purpose of comparison with the prior art, the size of the data storage field and the number of the variable length code words to be transferred are identical to those of the prior art. The variable length code words C1 to C9 are divided into two, first and second, groups and allocated into a given data storage field.

The variable length code words of the first group are aligned in a sequence from the front end of the data storage field towards the rear end (in the direction denoted by the dotted line arrow in FIGS. 2-a and 2-b). The variable length code words of the second group are also aligned in a reverse sequence from the rear end of the same towards the front end (in the direction denoted by the arrow in one-dot chain lines in FIGS. 2-a and 2-b).

The allocation of the code words shown in FIGS. 2-a will now be described.

The variable length code words shown in FIG. 2-a are divided into two groups so that the data (or the total number of bits) of each group is almost equal to that of the other group. Bits of the variable length code words C1 to C5 are summed up to be equal to about a half the overall bit length, 23 bits, of the data storage field. Hence, C1 to C5 constitute the first group together with the mark code C9 while the remaining code words C6 to C8 form the second group.

If a vacant space of S bits is present between the first and second groups, it is filled with an S-bit dummy data DM added to the end of the second group. The dummy data DM is made from an S-bit portion of one variable length code word which contains more bits than S bits.

When the dummy data added to the end of the second group is decoded, it indicates that the decoding is made across the boundary (the end of the mark code C9) between the first and second groups. Accordingly, all the data of the second group can be recovered through decoding a region before the boundary of the first group.

The allocation of the code words shown in FIG. 2-b will be described.

The variable length code words shown in FIG 2-b are divided into two groups so that the number of the variable length code words as well as the data of each group are almost equal to those of the other group.

For matching the number of the variable length code words, the first group is composed of the odd numbered C1, C3, C5, C7, and C9 and the second group is composed of the even numbered C2, C4, C6, and C8. The allocation is also done for allowing the two groups to carry a nearly equal amount of the coded data. This procedure is similar to separation of a multiplicity of variable length code words to be transmitted into two equal data groups through shuffling the variable length code words. The shuffling causes the frequency of presentation of each variable length code word to be uniform in locations, whereby the first and second groups will almost be the same in the amount of data.

The variable length code words of the first and second groups are decoded alternately in words until the mark code is detected. Since all the variable length code words are decoded word by word, the dummy data DM will be no more needed.

The decoding of the variable length code words shown in FIGS. 2-a and 2-b will be explained with the presence of transmission error.

The locations of errors which are designated identical to those in the prior art for comparison, are represented by the X marks in FIGS. 2-a and 2-b. As portrayed, while the decoding of variable length code words in one of the two group is interrupted by a transmission error, the other group can continue to be decoded until another error is encountered. The code words remaining not decoded are held in a range denoted by the real line arrow in FIG. 2 and particularly, appear decreased in the number as compared with the prior art.

The number of variable length code words which are decoded when transmission error is caused by one-bit error is calculated for comparison between the prior art transmission of variable length code words allocated as shown in FIG. 1 and the method of the present invention for transmission of variable length code words allocated as shown in FIGS. 2-a and 2-b.

It is assumed that the occurrence of transmission error is equal in frequency at each bit location of the data storage field.

When an error occurs at the front end of the variable length code words in the data storage field according to the prior art, no data will be decoded correctly. When an error occurs in the rear end of the data storage field, the number of data remaining not decoded is 1 or 0. Accordingly, it is said that a half of the overall data can be decoded in average.

In the method for transmission of variable length code words of the present invention allocated as shown in FIGS. 2-a or 2-b, one signal error affects only one of the two groups of the variable length code words which are almost the same in bit amount. More particularly, a half of the data in the group where the error is involved is correctly decoded in average while all the data in the other group where no error occurs successfully is decoded. It is hence found that ¾ of the overall data will correctly be decoded in average according to the present invention.

Strictly speaking, when one of the two groups carries an error, the end of the other group becomes less noticeable. However, the two groups are almost the same in the bit amount and most of the data can be decoded through decoding from both the ends of the data storage field to the central region.

It is now understood that the transmission of variable length code words according to the present invention allows more data to be decoded for playback without decrease in the coding efficiency as compared with the prior art. More specifically, the decoding of data is enhanced about 50% more when a one bit error only is involved.

Although the allocation of the variable length code words shown in FIGS. 2-a and 2-b contains a mark code added to the first group, another mark code may be added to the second group.

It is also possible that a known technique of interposing a synchronization code between the two adjoined variable length code words for providing the limit of error propagation or of separately transmitting a signal of side information identifying the end of a group of the variable length code words, is additionally employed in the present invention.

FIG. 3 illustrates a transmission apparatus employing the method for transmission of variable length code words of the present invention, in which the variable length code words are allocated into a data storage field as shown in FIG. 2-b.

As shown in FIG. 3, there are provided an input terminal 301 for receiving data D to be encoded to variable length code words, a transmitter 302, a transmission line 303, a receiver 304, and an output terminal 305 for delivery of the data D which is decoded and transferred through.

The transmitter 302 comprises a variable length coding circuit 306 for encoding the data D supplied from the terminal 301 to a series of data V which are in turn delivered in blocks, a stuffing circuit 307 for allocating the data V of each block into a data storage field of the transmission format, an error correction coding circuit 308, and a modulating circuit 309.

The receiver 304 comprises a demodulating circuit 310, an error correcting circuit 311 for detection and correction of an error in the variable length code word C received, a destuffing circuit 312 for retrieving the data V from the data storage field through a reverse action of the loading at the stuffing circuit 307, and a variable length code decoding circuit 313 for decoding the data V through a reverse action of the variable length coding at the variable length coding circuit 306 to the original data D which is thus delivered from the terminal 305.

The operation of the transmission apparatus of the present invention having the foregoing arrangement will now be described along with the more detail explanation of its primary components.

In operation, the data D to be transmitted is fed from the input terminal 301 of the transmitter 302 to the variable length coding circuit 306 where it is code converted to a main data V and a code length data L. The data V is a fixed length of data in bit parallel form and code converted into a variable length code word C through shifting the leading L bits to a bit serial form. A series of the data V are divided into blocks, each data block being further separated into two, first and second, groups. The first group of the data V is parallel-to-serial converted to a set of variable length code words C which are aligned in a sequence from the front end of a data storage field. The second group of the data V is also parallel-to-serial converted to another set of variable length code words C which are then aligned in a reverse order from the rear end of the data storage field. Then, an error correcting code is added by the error correction coding circuit 308 to the variable length code words C allocated into the data storage field. The sum of the data groups is modulated by the modulating circuit 309 and transferred to the transmission line 303. The size of a block is determined so that the overall number of bits of the variable length code words C converted from a given length of the data V is smaller than the bit length of the data storage field.

Figure 4:
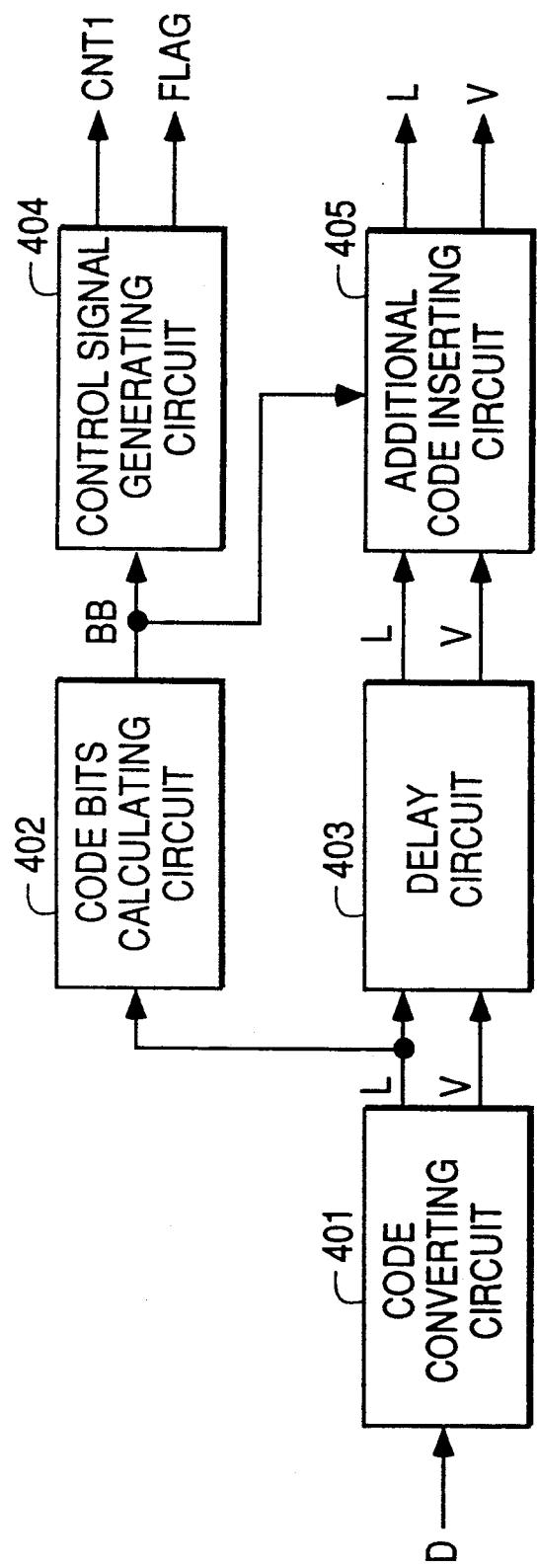
FIG. 4 is a block diagram of a variable length coding circuit shown in FIG. 3.

FIG. 4 is a block diagram of the variable length coding circuit 306.

As shown in FIG. 4, there are provided a code converting circuit 401 for receiving the data D and delivering the data V and the code length data L, a code bits calculating circuit 402 for determining the bit length of each block, a delay circuit 403 for timing control, a control signal generating circuit 404 for producing a control signal CNT1 and an identification signal FLAG, and an additional code inserting circuit 405 for applying an additional code or a mark code to the data V of each block.

The operation of the variable length coding circuit 306 having the foregoing arrangement will be described.

The data D fed from the terminal 301 shown in FIG. 3 is converted to a data V by the code converting circuit 401. The code converting circuit 401 may be a ROM (read only memory) carrying e.g. Table 1 for code

TABLE 1

Code Conversion Table

| Input | | | Output | | | | | | | | | |
|---|---|---|---|---|---|---|---|---|---|---|---|---|
| D | | | L | | | | V | | | | | |
| 0 | 0 | 0 | 0 | 0 | 1 | 0 | X | X | X | X | X | X |
| 0 | 0 | 1 | 0 | 1 | 0 | 1 | 0 | X | X | X | X | X |
| 0 | 1 | 0 | 0 | 1 | 1 | 1 | 0 | X | X | X | X | X |
| 0 | 1 | 1 | 1 | 0 | 0 | 1 | 1 | 0 | X | X | X | X |
| 1 | 0 | 0 | 1 | 0 | 1 | 1 | 1 | 1 | 0 | X | X | X |
| 1 | 0 | 1 | 1 | 1 | 0 | 1 | 1 | 1 | 1 | 0 | X | X |
| 1 | 1 | 0 | 1 | 1 | 1 | 1 | 1 | 1 | 1 | 1 | 0 | X |
| 1 | 1 | 1 | 1 | 1 | 1 | 1 | 1 | 1 | 1 | 1 | 1 | 1 |

Digits are shown in binary.
Left end represents an MSB (most significant bit).
D: Data to be processed by variable length coding
L: Length of variable length code
V: Data
X: Do not care

TABLE 2

Code Reverse Conversion Table

| Input | | | | | | | Output | | | | | |
|---|---|---|---|---|---|---|---|---|---|---|---|---|
| V | | | | | | | L | | | D | | |
| 0 | X | X | X | X | X | X | 0 | 0 | 1 | 0 | 0 | 0 |
| 1 | 0 | X | X | X | X | X | 0 | 1 | 0 | 0 | 0 | 1 |
| 1 | 1 | 0 | X | X | X | X | 0 | 1 | 1 | 0 | 1 | 0 |
| 1 | 1 | 1 | 0 | X | X | X | 1 | 0 | 0 | 0 | 1 | 1 |
| 1 | 1 | 1 | 1 | 0 | X | X | 1 | 0 | 1 | 1 | 0 | 0 |
| 1 | 1 | 1 | 1 | 1 | 0 | X | 1 | 1 | 0 | 1 | 0 | 1 |
| 1 | 1 | 1 | 1 | 1 | 1 | 0 | 1 | 1 | 1 | 1 | 1 | 0 |
| 1 | 1 | 1 | 1 | 1 | 1 | 1 | 1 | 1 | 1 | 1 | 1 | 1 |

D: Decoded data
L: Length of variable length code
V: Data to be reverse converted
X: Do not care conversion and thus can deliver not only the data V converted from the input D but also a data L which indicates the code length of the code data V. The bit length of the data V is fixed and equal to the maximum bit length of a variable length code word. The data V is delivered in the bit parallel form. The leading L bits of the data V are converted to a bit serial form which becomes the variable length code word C. The data V can be converted to a variable length code word C of L-bit length by the stuffing circuit 307 shown in FIG. 3.

A series of the data V are divided by the factor of a block consisting of a given number of the data V. The plurality of the data V in each block are serial-to-parallel converted to variable length code words C which are allocated into a corresponding data storage field. If an (m−1)-th data V is the last one in the block, the following block starts with an m-th data V. The first data V in each block is determined by the code bits calculating circuit 402. In the code bits calculating circuit 402, the code length L of each variable length code word C after the m-th data is accumulated one by one. When the sum of an (m+n) number of the data exceeds the given value, the code bits calculating circuit 402 designates (m+n−1)-th data V as the last one in the following block. The given value is determined by subtracting the bit length of a mark code from the bit length of the data storage field. The code bits calculating circuit 402 upon determining the end of a block delivers a control signal BB which indicates the block end. Both the data V and the code length data L passing the delay circuit 403 are fed to the additional code inserting circuit 405 where a mark code added to the end of the block in response to the control signal BB and further transferred to the stuffing circuit 307 shown in FIG. 3. The control signal generating circuit 404 upon receiving the control signal BB from the code bits calculating circuit 402 produces a control signal CNT1 for activating the stuffing circuit 307 prior to arrival of the front end data V of the block and also, a signal FLAG in synchronism with the two data V and L.

When the identification signal FLAG is 0, the data V introduced belongs to the first group and when 1, it belongs to the second group. The signal FLAG is produced by frequency dividing by two the transfer clock for the two data V and L, whereby each odd-number-th of the variable length code word in the block will be assigned to the first group and each even-number-th to the second group.

Figure 5:
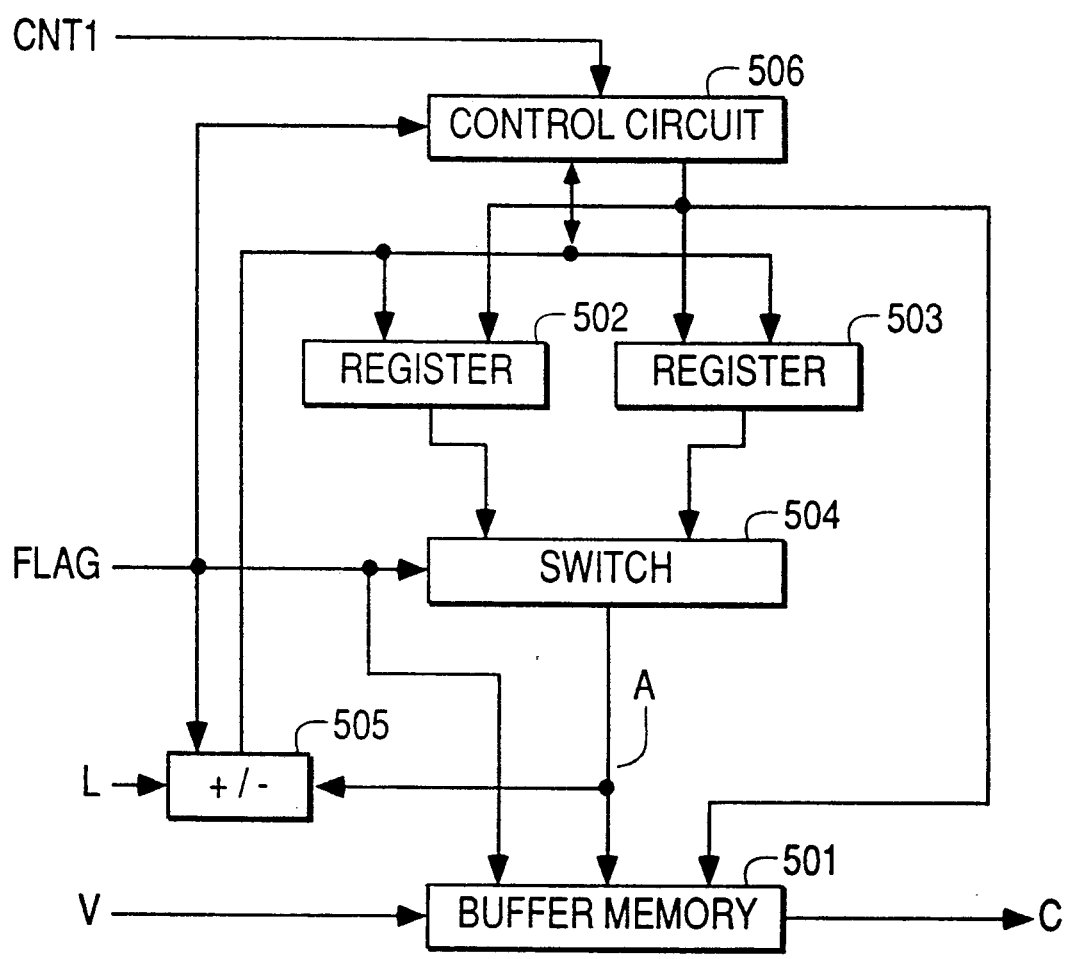
FIG. 5 is a block diagram of a stuffing circuit shown in FIG. 3.

FIG. 5 is a block diagram of the stuffing circuit 307.

As shown in FIG. 5, there are provided a buffer memory 501 carrying data storage fields, a couple of registers 502 and 503, a switch 504 for producing an address data A on selecting one of the two outputs from their respective registers 502 and 503 in response to the signal FLAG, an adder/subtracter 505 for conducting addition operation when the signal FLAG is 0 and subtract operation when it is 1, and a control circuit 506 for controlling the registers 502 and 503 and the buffer memory 501 according to the control signal CNT1 and the identification signal FLAG from the variable length coding circuit 306.

The operation of the stuffing circuit 307 having the foregoing arrangement will be described.

The control circuit 506 is activated by the control signal CNT1 from the variable length coding circuit 306 to start stuffing of the data V into a given data storage field in the buffer memory 501. It starts with loading the address of the front and rear ends of the target data storage field in the buffer memory 501 as initial setting values to the two registers 502 and 503.

The register 502 carries a write start address of a variable length code word C which is obtained through parallel-to-serial conversion of a data V of the first group to be loaded subsequently. The register 503 carries a write start address of a variable length code word C which is obtained through parallel-to-serial conversion of a data V of the second group to be loaded subsequently. Then, the switch 504 selects an output of the register 502 when the signal FLAG is 0 or of the resister 503 when it is 1 and the output is delivered as an address data A.

A unit of the data V is parallel-to-serial converted word by word and written into the data storage field of the buffer memory 501 in a sequence of bits from the address instructed by the address data A. During the write operation of each bit, the address is incremented one bit if the signal FLAG is 0 and decremented one bit if 1. Accordingly, the variable length code words C of the first group are stored in the front half, upward from the address location determined by the resister 502, of the data storage field while the variable length code words C of the second group are stored in the rear half downward from the address location determined by the resister 503. Also, the buffer memory 501 contains a shift register for parallel-to-serial conversion and a counter for counting up and down of the address, both not shown, as well as a memory circuit.

While one of the variable length code words C is loaded to the buffer memory 501, the two registers 502 and 503 are updated. More particularly, when the signal FLAG is 0, the output of the register 502 is fed by the switch 504 to the adder/subtracter 505 where it is added to the code length data L. A resultant sum is then written into the register 502. When the signal FLAG is 1, the output of the register 503 is fed by the switch 504 to the adder/subtracter 505 where it is subtracted from the code length data L. A subtracted result is then written into the register 503.

Through a series of operations for writing of the variable length code words and updating the registers 502 and 503, all the variable length code words C in the block are loaded into the data storage field. Then, the variable length code words C are retrieved from the data storage field bit by bit from the front end to the rear end and further transferred to the error correction coding circuit 308.

In the receiver 304 shown in FIG. 3, the signals fed from the transmission line 303 are demodulated by the demodulating circuit 310 and the detection and correction of error at the error correcting circuit 311 follows. The code data C from the error correcting circuit 311 is processed by the destuffing circuit 312 for the reverse operation of stuffing with the stuffing circuit 307, in which the data V in the block is unloaded from the data storage field. The data V from the destuffing circuit 312 is then decoded by the variable length code decoding circuit 313, where the reverse operation of encoding at the variable length coding circuit 306 is carried out, to the original data D which is delivered from the terminal 305.

Figure 6:
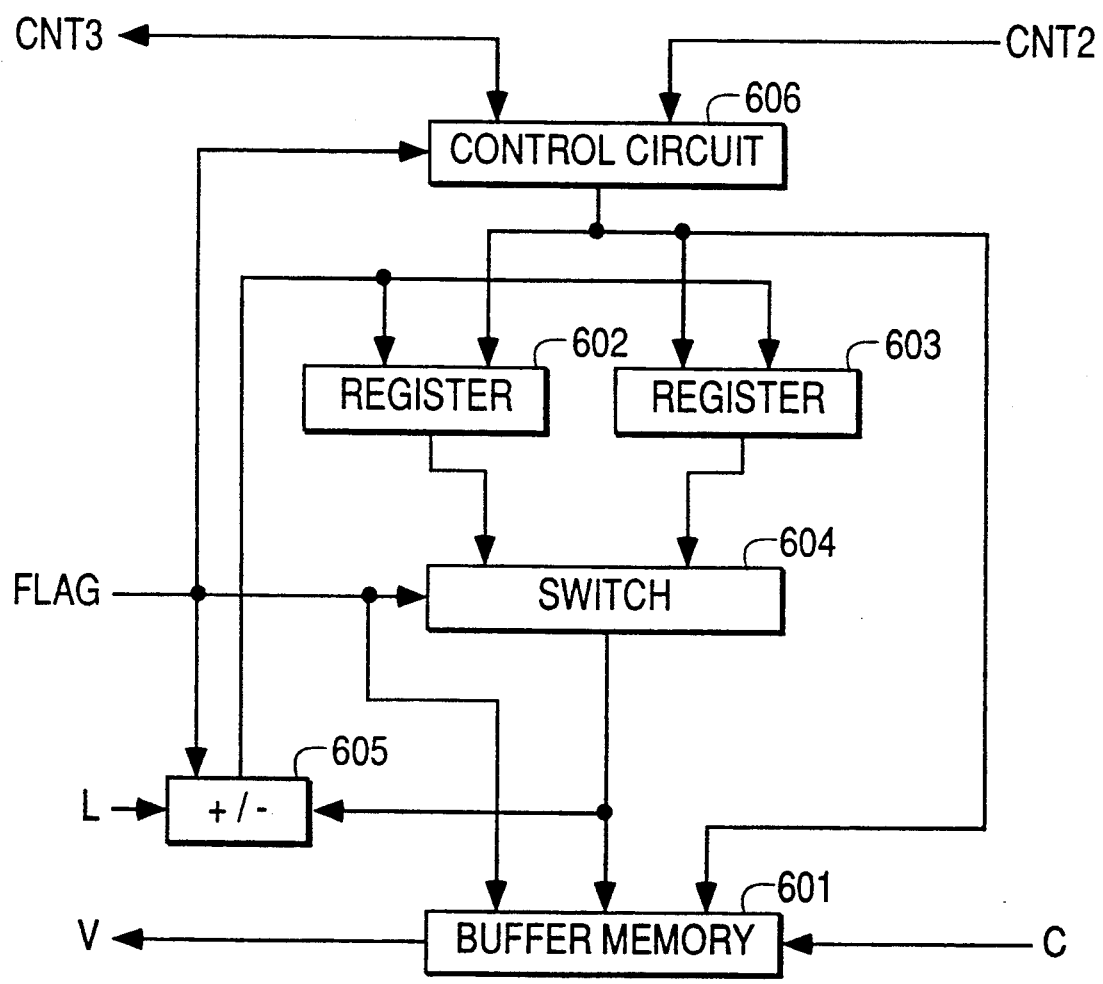
FIG. 6 is a block diagram of a destuffing circuit shown in FIG. 3.

FIG. 6 is a block diagram of the destuffing circuit 312.

As shown in FIG. 6, there are provided a buffer memory 601 carrying data storage fields, a couple of registers 602 and 603, a switch 604 for producing an address data A on selecting one of the two outputs from their respective registers 602 and 603 in response to the signal FLAG, an adder/subtracter 605 for executing addition operation when the signal FLAG is 0 and subtract operation when it is 1, and a control circuit 606 for controlling the registers 602 and 603 and the buffer memory 601 in response to input of a control signal CNT2 and the identification signal FLAG from the variable length code decoding circuit 313 and input/output of a control signal CNT3. The control signal CNT2 carries control information about error location and is supplied from the error correcting circuit 611. The control signal CNT3 is a control instruction exchanged between the destuffing circuit 312 and the variable length code decoding circuit 313.

The operation of the destuffing circuit 312 having the foregoing arrangement will be described.

As shown in FIG. 6, the variable length code words C from the error correcting circuit 311 are loaded bit by bit into the data storage field of the buffer memory 601 from the front end to the rear end.

After the write operation is completed, destuffing or retrieval of the variable length code words C from the data storage field in the buffer memory 601 is commenced. Simultaneously, the control circuit 606 sends the control signal CNT3 to start the variable length code decoding circuit 313.

First, the address of the front and rear ends of the target data storage field in the buffer memory 601 is loaded as initial setting to the two registers 602 and 603.

The register 602 carries a read start address of a variable length code word C of the first group to be retrieved subsequently. The register 603 carries a read start address of a variable length code word C of the second group to be retrieved subsequently. Then, the switch 604 selects an output of the register 602 when the signal FLAG is 0 or of the resister 603 when it is 1 and the output is delivered as an address data A.

In the buffer memory 601, the maximum word length of a variable length code word C is read bit by bit from the address in the data storage field instructed by the data A and serial-to parallel converted to a word data V. During the read operation of each bit, the address is incremented one bit if the signal FLAG is 0 and decremented one bit if 1. Accordingly, the variable length code words C of the first group are retrieved from the front half, upward from the address location determined by the register 602, of the data storage field while the variable length code words C of the second group are retrieved from the rear half downward from the address location determined by the resister 603. Also, the buffer memory 601 contains a shift register for serial-to-parallel conversion and a counter for counting up and down of the address, both not shown, as well as a memory circuit.

The word data V retrieved is fed to the variable length code decoding circuit 313 where it is decoded to the code length data L. Accordingly, the read start address for variable length code words C to be retrieved subsequently will be set to the two registers 602 and 603 by the following procedure. When the signal FLAG is 0, the output of the register 602 is fed by the switch 604 to the adder/subtracter 605 where it is added to the code length data L. A resultant sum is then written into the register 602. When the signal FLAG is 1, the output of the register 603 is fed by the switch 604 to the adder/subtracter 605 where it is subtracted from the code length data L. A subtracted result is then written into the register 603.

Through a series of operations for reading of the variable length code words and updating the registers 602 and 603, all the variable length code words C in the block are retrieved from the data storage field. The read operation is finished by the control signal CNT3 from the variable length code decoding circuit 313.

Figure 7:
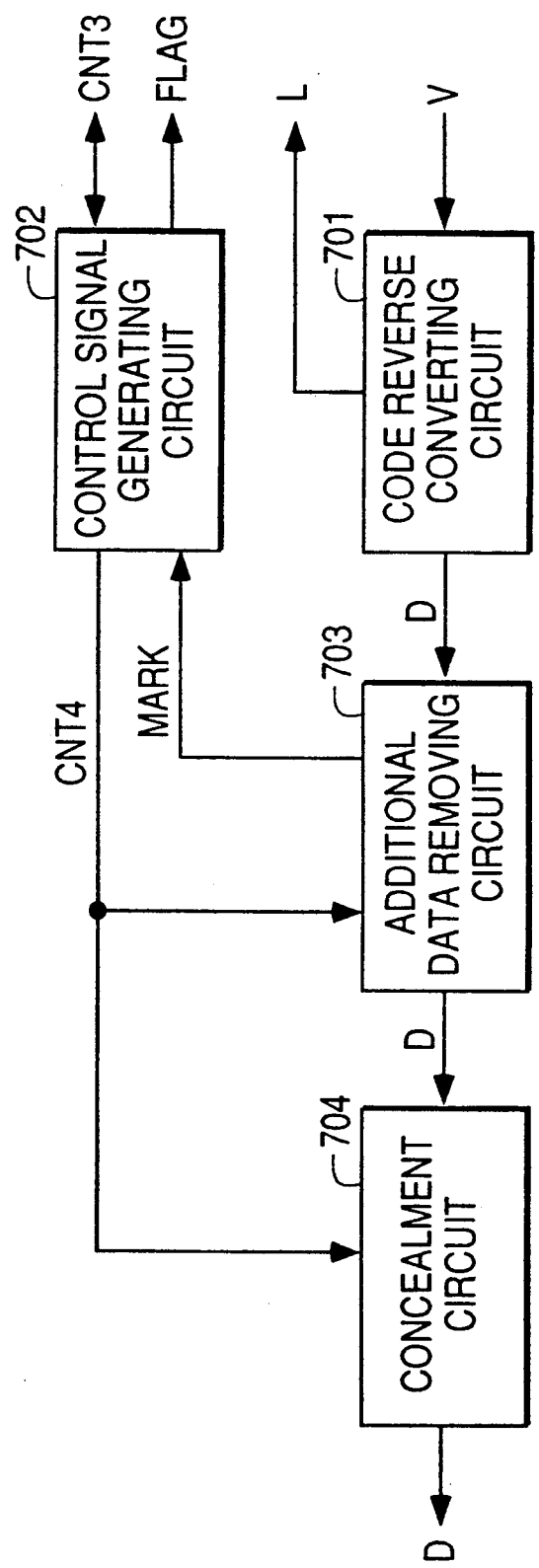
FIG. 7 is a block diagram of a variable length code decoding circuit shown in FIG. 3.

FIG. 7 is a block diagram of the variable length code decoding circuit 313.

As shown in FIG. 7, there are provided a code reverse converting circuit 701 for producing a code length data L and a decoded data D from the data V supplied from the destuffing circuit 312 shown in FIG. 3, a control signal generating circuit 702 for producing an identification signal FLAG and a control signal CNT4 in response of input of a mark signal and input/output of the control signal CNT3, an additional data removing circuit 703 for upon detecting an additional data decoded from the mark code, producing the mark signal and removing the additional data, and a concealment circuit 704 for inserting an interpolation value, derived from adjacent data, in place of a data which fails to be reproduced due to transmission error.

The operation of the variable length code decoding circuit 313 having the foregoing arrangement will be described.

The control signal generating circuit 702 shown in FIG. 7 produces a FLAG signal from a transmission clock of the data V. As the signal FLAG is generated by a flip-flop which is initialized for each block to frequency divide the transmission clock, both a data V of the first group and a data V of the second group are alternately supplied from the destuffing circuit 312 shown in FIG. 3. A set of the data V will be identical to the data V from the variable length coding circuit 306 shown in FIG. 3.

If the presence of error which cannot be corrected is detected in one of the two groups of the variable length code word block, the retrieval of the further variable length code words after the error location in the group is interrupted. Then, the control signal generating circuit 702 delivers the signal FLAG instructing the retrieval of variable length code words from the other group.

The data V from the destuffing circuit 312 shown in FIG. 3 is converted by the code reverse converting circuit 701 to the code length data L and the decoded data D. The code reverse converting circuit 701 may be a ROM (read only memory) carrying e,g, Table 2 for data conversion. The code length data L is used in the destuffing circuit 312 as described previously.

Each data D from the code reverse converting circuit 701 is compared by the additional data removing circuit 703 with the additional data decoded from the mark code and will be removed if it is identical to that. This is because the mark code is provided for the purpose of identifying the boundary between the two variable length code word groups in the block and after decoding, will no more be needed.

The additional data removing circuit 703 produces the mark signal when detecting the additional data. The control signal generating circuit 702 upon receiving the mark signal delivers the control signal CNT3 to the destuffing circuit 312 for completion of reading the data V. As the result, the variable length code words can fully be retrieved from the data storage field by the destuffing circuit 312 if no error occurs.

The data D from the additional data removing circuit 703 is directly released from the concealment circuit 704 if no error is present in the data storage field. If an error causes unsuccessful retrieval, an interpolation value derived from the adjacent data is applied in place of the data which fails to be reproduced.

As set forth above, the present invention allows a set of the variable length code words to be transmitted in such a particular arrangement, e.g. shown in FIG. 2-b, that more variable length code words can correctly be decoded, while the transmission error is present, as compared with the prior art.

It is understood that the arrangement of components for executing the transmission of variable length code words according to the present invention will be modified and altered, and not limited to that of the embodiment.

The division into two groups of the variable length code words allocated into a data storage field will also be carried out by other methods than the foregoing. For example, the division into two may be conducted (in the respect of e.g. order or number of data bits) concerning the location of error, a bias in the error frequency, and the significance of each code word.

Also, it is possible that the data storage field contains at a given location fixed length codes in addition to variable length code words.

The data storage field may carry a predetermined amount of data within a limitation and be varied in the storage capability. Furthermore, the data storage field may not coincide with the physical extension of a data storage field in a given transmission format (e.g. data area in a packet for packet data transmission or in a sector of a disk form medium).

For a transmission format in which fixed length data are loaded to a given area of a data storage unit, the data storage field of the present invention is designated as a series of regions given by eliminating the areas of the fixed length data from the data storage units.

Figure 8:
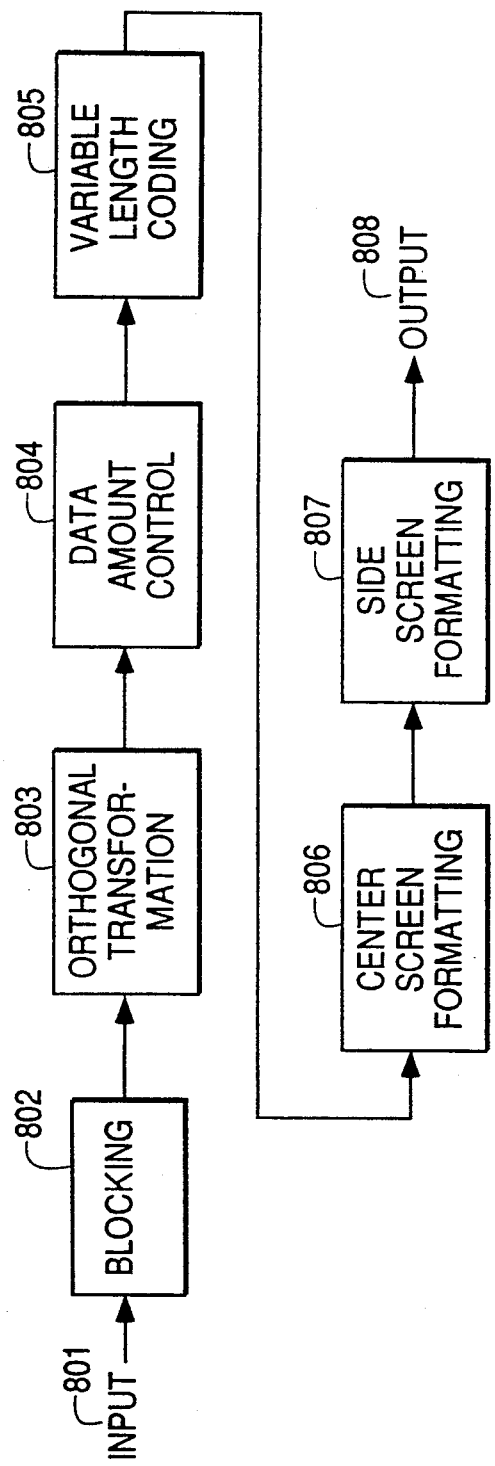
FIG. 8 is a block diagram of a coding apparatus showing another embodiment of the present invention.

FIG. 8 is a block diagram of a video signal coding apparatus showing a second embodiment of the present invention.

As shown in FIG. 8, there are provided an input terminal 801 for receiving video signals, a blocking circuit 802, an orthogonal transforming circuit 803, a data amount controlling circuit 804, a variable length coding circuit 805, a center screen formatting circuit 806, a side screen formatting circuit 807, and an output terminal 808.

The operation of the video signal coding apparatus having the foregoing arrangement will be described.

The first video signal of a 16:9 aspect ratio fed from the input terminal 801 is divided by the blocking circuit 802 into blocks, each block consisting of a plurality of pixels. FIG. 9 is an explanatory view showing the blocking operation of the circuit 802. A picture of 16:9 aspect ratio derived from a first video signal is separated to a center screen portion at a 4:3 aspect ratio and a side screen portion which appears on both sides of the center screen portion. The center screen portion of the picture is identical to a picture of the second video signal and thus, common to both the first and second video signals, whereby its corresponding signal will be referred to as "first signal". A signal corresponding to the side screen portion, which is not common to the first and second video signals, will be referred to as "second signal". At the blocking circuit 802 shown in FIG. 8, the pixels in the center and side screen portions are divided into N groups respectively. Then, N groups of the center screen portion pixels and N groups of the side screen portion pixels are paired with each other forming N blocks. N is an integer more than 1.

Figure 10:
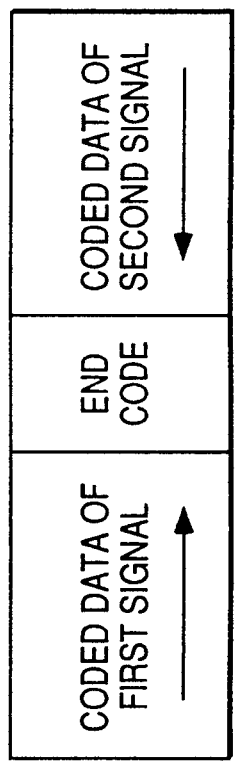
FIG. 10 illustrates an example of the allocation of variable length code words into a data storage field of the transmission format according to the present invention.

The center screen portion ("first signal") and the side screen portion ("second signal") in each block are orthogonal transformed in units of a given number of pixels by the orthogonal transforming circuit 803 shown in FIG. 8. Resultant orthogonal components after processed by variable length coding are determined by the data amount control circuit 804 to carry code bits of less than a given number in each block. The code amount control is carried out by rounding the magnitude of each orthogonal component. The rounded orthogonal components are then transferred to the variable length coding circuit 805 where they are converted to variable length code words. Simultaneously, an end code is added to each basic unit of the orthogonal transformation. Two groups of the variable length code words in each block derived from the center and side screen portion pixels are now termed as a first and a second variable length code word group respectively. The variable length code words are format processed by the center screen formatting circuit 806. More specifically, the first group variable length code words of each block are allocated into one data storage field of the transmission format from one end to the other. This format conforms to a format of a coding apparatus designed for processing the second video signal of a 4:3 aspect ratio. The variable length code word group for the center screen portion ends up with an end code which may be substituted by the end code in each orthogonal transformation. Then, the second group variable length code words are allocated by the side screen formatting circuit 807 into the remaining area of the data storage field where no code is loaded from the other end, prior to further transfer from the output 808. FIG. 10 illustrates an arrangement of the variable length code words in the data storage field executed across the center and side screen formatting circuits 806 and 807. As apparent from FIG. 10, the variable length code word group of the center screen data extends in a sequence from the front end of the data storage field up to the end code. This arrangement is identical to the format of a second video signal coding apparatus and thus, the code data is accepted by the second video signal coding apparatus so that the end mark is allocated close to the rear end of a data storage field. Accordingly, the center screen data can be decoded by a decoding apparatus designed for processing the second video signal. Also, the variable length code words of the side screen data are loaded from the rear end of the data storage field and can thus be decoded separately.

As set forth above, the code data encoded by the coding apparatus of the present invention can equally be decoded by either a second video signal decoding apparatus associated with an aspect ratio of 4:3 or a first video signal decoding apparatus associated with an aspect ratio of 16:9.

The addition of the end mark may be executed by the formatting circuit 806. The principle of the present invention is also applicable to other formats than the format described above. Also, the method for code data transmission of the present invention allows a difference signal between a high definition TV signal and an existing TV signal to be recorded as an extra or side screen data thus providing interface with high definition TV signal systems. More particularly, a common signal to the first and second video signals or a not-common signal, which represents pixel data, may concern its converted form, e.g. frequency form or orthogonal transmission form. Although the highly efficient coding involves orthogonal transformation in the embodiments, it may be of prediction coding, ADRC, or other coding technique.

Also, the coding apparatus of the present invention is capable of reproducing a center screen portion of the 16:9 aspect ratio picture from the first video signals with the use of a second video signal decoder associated with a 4:3 aspect ratio. According to the present invention, a high efficiency decoder designed for the first video signal can be compatible with a decoder for the second video signal.

We claim:

1. A method for transmission of two groups of variable length code words which are allocated into a data storage field having a given bit length, comprises:
    a first step of allocating the variable length code words of the first group into the data storage field in a sequence from the front end towards the rear end; and
    a second step of allocating the variable length code words of the second group into the data storage field in a reverse sequence from the rear end towards the front end.

2. A method according to claim 1, wherein at least one of the two, first and second, steps has a procedure of adding a code word, which indicates a boundary between the two variable length code word groups, to the end of one group.

3. A method according to claim 1, wherein at least one of the two, first and second, steps has a procedure of filling a vacant space of S bits (S>0) in the data storage field with a dummy data prepared from the leading S bits of one variable length code word which has a bit length greater than S bits.

4. A method for transmission of variable length code words which are allocated into a data storage field having a given bit length, comprises:
    a step of dividing the variable length code words into two groups;
    a first step of allocating the variable length code words of the first group into the data storage field in a sequence from the front end towards the rear ends; and
    a second step of allocating the variable length code words of the second group into the data storage field in a reverse sequence from the rear end towards the front end.

5. A method according to claim 4, wherein at least one of the two, first and second, steps has a procedure of adding a code word, which indicates a boundary between the two variable length code word groups, to the end of one group.

6. A method according to claim 4, wherein at least one of the two, first and second, steps has a procedure of filling a vacant space of S bits (S>0) in the data storage field with a dummy data prepared from the leading S bits of one variable length code word which has a bit length greater than S bits.

7. A method according to claim 4, wherein the step of dividing the variable length code words into two groups performs so that the two groups are almost equal to each other in the bit amount.

8. A method according to claim 4, wherein the step of dividing the variable length code words into two groups performs so that the two groups are almost equal to each other in the code word amount.

9. A method according to claim 8, wherein the step of dividing the variable length code words into two groups has a procedure of shuffling the variable length code words in words.

10. A video signal coding apparatus for encoding a first video signal at high efficiency by means of variable length coding, comprises:
    a blocking circuit for dividing into N groups first signal data, which represent a common signal area data to the first video signal and a second video signal which is different in type from the first video signal, and also, second signal data into N groups, which represent a not-common signal area data, and coupling the first signal data groups and the second signal data groups with each other to form an N number of blocks, each block consisting of a first and a second signal data group;
    a coding circuit for encoding the first signal data of each block to a first group of variable length code words and the second signal data of the block to a second group of variable length code words so that a sum of the bit amount of the first group variable length code words and the bit amount of the second group variable length code words is not more than a given value; and
    a formatting circuit for allocating the first group variable length code words of each block into a data storage field of the transmission format in a sequence from one end of the data storage field and the second group variable length code words into the remaining area of the data storage field where no first group data is loaded.

11. A coding apparatus according to claim 10, wherein the coding circuit performs adding an end code to the end of the first variable length code word group.

12. A coding apparatus according to claim 10, wherein the formatting circuit performs adding an end code to the end of the first variable length code word group.

13. A coding apparatus according to claim 10, wherein the formatting circuit performs loading the second variable length code word group into the data storage field from the other end of the same.

14. A coding apparatus according to claim 10, wherein the first video signal incorporates an enlargement of the screen developed by the second video signal.

* * * * *